(12) United States Patent
Lenz et al.

(10) Patent No.: US 10,949,863 B1
(45) Date of Patent: Mar. 16, 2021

(54) SYSTEM AND METHOD FOR ACCOUNT ABUSE RISK ANALYSIS

(71) Applicant: Wells Fargo Bank, N.A., San Francisco, CA (US)

(72) Inventors: Jimmie H. Lenz, Isle of Palms, SC (US); Ibrahima Yague, Phoenix, AZ (US); Miao Zuo, Chandler, AZ (US); Ying Jessica Zhao, Fremont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 680 days.

(21) Appl. No.: 15/164,640

(22) Filed: May 25, 2016

(51) Int. Cl.
*G06Q 30/00* (2012.01)
*G06Q 40/00* (2012.01)

(52) U.S. Cl.
CPC ......... *G06Q 30/0185* (2013.01); *G06Q 40/12* (2013.12)

(58) Field of Classification Search
CPC .......................... G06Q 40/12; G06Q 30/0185
See application file for complete search history.

(56) References Cited

U.S. PATENT DOCUMENTS

| | | | | |
|---|---|---|---|---|
| 4,346,442 A * | 8/1982 | Musmanno | .......... | G06Q 20/403 283/58 |
| 4,376,978 A * | 3/1983 | Musmanno | .......... | G06Q 20/403 705/35 |
| 4,597,046 A * | 6/1986 | Musmanno | ............ | G06Q 40/00 705/35 |
| 6,119,103 A | 9/2000 | Basch et al. | | |
| 6,338,047 B1 * | 1/2002 | Wallman | ................ | G06Q 40/06 705/36 R |
| 7,946,474 B1 | 5/2011 | Agrawal | | |
| 8,090,648 B2 * | 1/2012 | Zoldi | ..................... | G06Q 10/10 705/38 |
| 8,403,209 B2 * | 3/2013 | Davila | ................. | G06Q 20/042 235/379 |
| 8,595,033 B1 * | 11/2013 | Schoen | .................. | G06Q 40/04 705/35 |
| 8,600,872 B1 * | 12/2013 | Yan | ........................ | G06Q 40/02 705/35 |

(Continued)

OTHER PUBLICATIONS

Rentnall, A. R., Crowder, M. J., & Hand, D. J. (2010). Predicting the amount individuals withdraw at cash machines using a random effects multinomial model. Statistical Modeling, 197-214 (Year: 2010).*

(Continued)

*Primary Examiner* — Peter Ludwig
*Assistant Examiner* — Michael Jared Walker
(74) *Attorney, Agent, or Firm* — Schwegman Lundberg & Woessner, P.A.

(57) ABSTRACT

A method for detecting abuse of an account can include receiving historical transaction information for a population of asset accounts from a transaction database, establishing a transaction threshold for the population of asset accounts at a fraud analysis circuit using the historical transaction information, comparing a transaction ratio with the transaction threshold, wherein the transaction ratio is based on transactions occurring during an analysis interval, and providing alert information if a transaction ratio associated with the analysis interval, exceeds the transaction threshold.

23 Claims, 4 Drawing Sheets

(56) References Cited

U.S. PATENT DOCUMENTS

| | | | | |
|---|---|---|---|---|
| 8,639,622 | B1* | 1/2014 | Moore | G06Q 20/405 |
| | | | | 705/35 |
| 8,660,943 | B1* | 2/2014 | Chirehdast | G06Q 40/00 |
| | | | | 705/38 |
| 8,918,904 | B2* | 12/2014 | Sanin | H04L 51/32 |
| | | | | 705/38 |
| 2003/0033228 | A1* | 2/2003 | Bosworth-Davies | |
| | | | | G06Q 20/04 |
| | | | | 705/35 |
| 2003/0233278 | A1* | 12/2003 | Marshall | G06Q 30/00 |
| | | | | 705/14.35 |
| 2004/0164145 | A1* | 8/2004 | Licciardello | G06Q 20/04 |
| | | | | 235/381 |
| 2004/0177035 | A1* | 9/2004 | Silva | G06Q 20/10 |
| | | | | 705/39 |
| 2004/0230448 | A1* | 11/2004 | Schaich | G06Q 20/405 |
| | | | | 705/38 |
| 2006/0259390 | A1* | 11/2006 | Rosenberger | G06Q 20/04 |
| | | | | 705/35 |
| 2007/0203826 | A1* | 8/2007 | Russell | G06Q 20/40 |
| | | | | 705/38 |
| 2007/0288355 | A1* | 12/2007 | Roland | G06Q 10/00 |
| | | | | 705/38 |
| 2008/0010189 | A1* | 1/2008 | Rosenberger | G06Q 20/10 |
| | | | | 705/39 |
| 2008/0191007 | A1* | 8/2008 | Keay | G06Q 20/403 |
| | | | | 235/379 |
| 2008/0228615 | A1* | 9/2008 | Scipioni | G06Q 20/04 |
| | | | | 705/35 |
| 2008/0288382 | A1* | 11/2008 | Smith | G06Q 40/00 |
| | | | | 705/35 |
| 2009/0248465 | A1* | 10/2009 | Recce | G06Q 40/00 |
| | | | | 705/38 |
| 2009/0281816 | A1* | 11/2009 | Houga | G06F 21/55 |
| | | | | 705/346 |
| 2010/0114763 | A1* | 5/2010 | Rosenberger | G06Q 20/10 |
| | | | | 705/40 |
| 2012/0239557 | A1* | 9/2012 | Weinflash | G06Q 40/02 |
| | | | | 705/39 |
| 2013/0073438 | A1* | 3/2013 | Jabbour | G06Q 40/00 |
| | | | | 705/30 |
| 2013/0173495 | A1* | 7/2013 | Davidsohn | G06Q 40/06 |
| | | | | 705/36 R |
| 2013/0325599 | A1* | 12/2013 | Yeri | G06Q 30/02 |
| | | | | 705/14.49 |
| 2013/0325696 | A1* | 12/2013 | Graves | G06Q 30/00 |
| | | | | 705/39 |
| 2014/0058914 | A1* | 2/2014 | Song | G06Q 40/06 |
| | | | | 705/35 |
| 2014/0081699 | A1* | 3/2014 | Bammi | G06F 21/36 |
| | | | | 705/7.28 |
| 2014/0278733 | A1* | 9/2014 | Sabharwal | G06Q 10/0635 |
| | | | | 705/7.28 |
| 2014/0279526 | A1* | 9/2014 | Jackson | G06Q 20/381 |
| | | | | 705/44 |
| 2014/0279534 | A1* | 9/2014 | Miles | G06Q 20/42 |
| | | | | 705/44 |
| 2014/0304131 | A1* | 10/2014 | Gangopadhyay | G06Q 40/02 |
| | | | | 705/35 |
| 2014/0324658 | A1* | 10/2014 | Neumann | G06Q 40/04 |
| | | | | 705/37 |
| 2015/0006310 | A1* | 1/2015 | Murugappan | G06Q 30/08 |
| | | | | 705/26.3 |
| 2015/0046216 | A1* | 2/2015 | Adjaoute | G06Q 20/4016 |
| | | | | 705/7.29 |
| 2015/0066772 | A1* | 3/2015 | Griffin | G06Q 40/00 |
| | | | | 705/44 |
| 2015/0161611 | A1* | 6/2015 | Duke | G06Q 20/4016 |
| | | | | 705/44 |
| 2015/0294416 | A1* | 10/2015 | Bland | G06Q 40/04 |
| | | | | 705/37 |
| 2016/0034925 | A1* | 2/2016 | Unser | G06Q 30/0202 |
| | | | | 705/7.31 |
| 2016/0140562 | A1* | 5/2016 | Birukov | G06Q 20/4016 |
| | | | | 705/39 |
| 2017/0364918 | A1* | 12/2017 | Malhotra | G06Q 20/023 |

OTHER PUBLICATIONS

Brentnall, Adam R., "Predicting the amount individuals withdraw at cash machines using a random effects multinomial model" Statistical Modelling, 2010: 10(2) 197-214.

Merriman, Michael L., "Systematic Risk Factors, Macroeconomic Variables, and Market Valuation Ratios", (2008), 197 pgs.

* cited by examiner

SYSTEM AND METHOD FOR ACCOUNT ABUSE RISK ANALYSIS

TECHNICAL FIELD

Embodiments described herein generally relate to interaction analysis and in particular, but without limitation, to systems and methods for analysis of account abuse and alerting thereof.

BACKGROUND

Financial accounts provide many people with a sense of security and protection of the financial account can play a part in the institutions reputation. Unfortunately, abuse of a financial account can occur in such subtle forms that the abuse can be difficult even for the account holder to identify.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

The present inventors have recognized systems and method for analyzing a population of asset accounts and even a single asset account and assign a relative risk factor inactive of whether the account has been abused (e.g., someone is improperly accessing the account or spending money from the account). It is understood that an asset account can include, but is not limited to, a financial account, a bank account, a checking account, and investment account, or combinations thereof.

Figure 1:
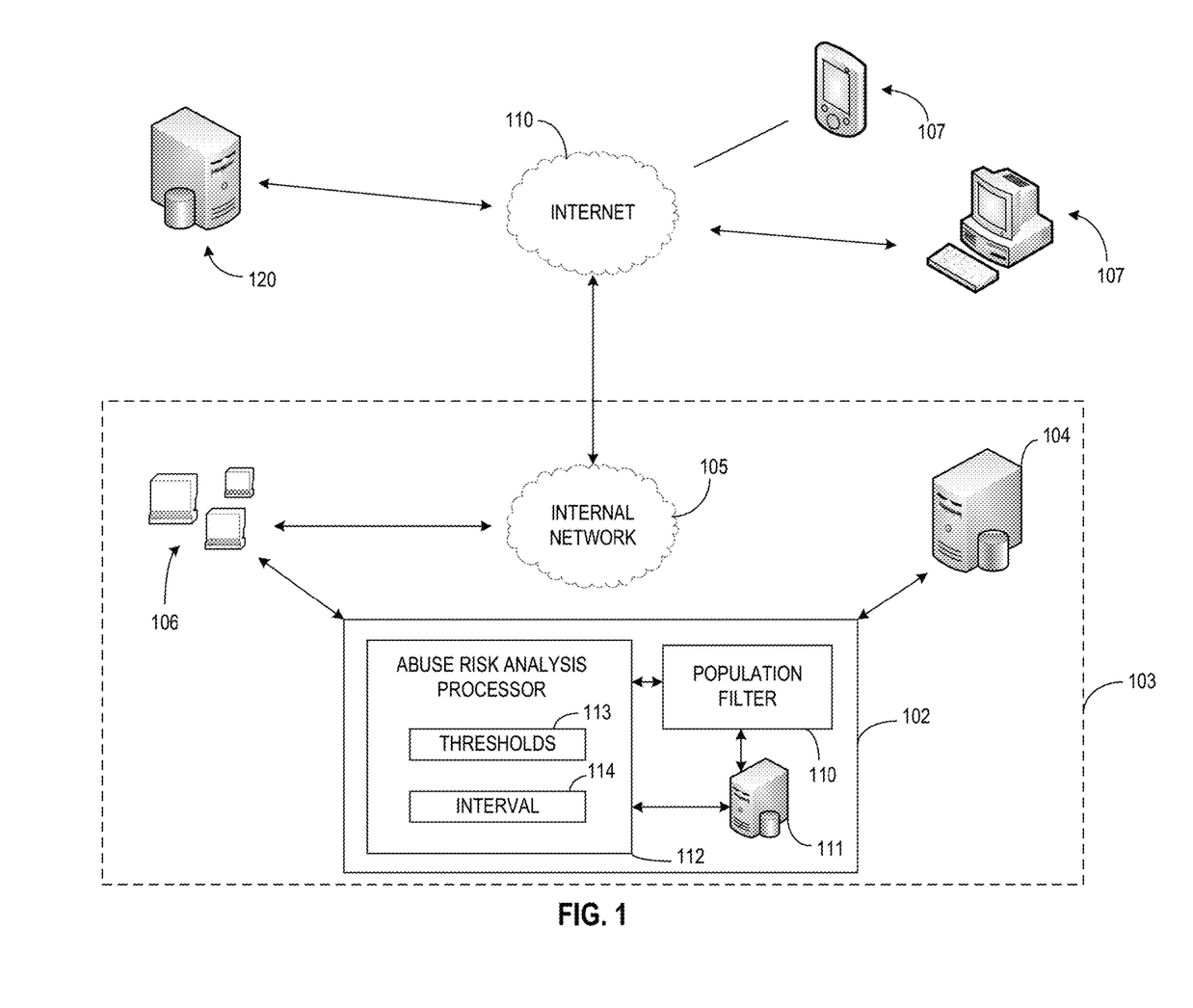
FIG. 1 is a schematic diagram of components interacting with an account abuse risk analysis system according to various examples.

FIG. 1 is a schematic diagram of components interacting with an account abuse risk analysis system 102, or fraud analysis circuit, according to various examples. In certain example, the account abuse risk analysis system 102 can be part of a larger system such as, but not limited to, a bank computer system or an investment firm computer system 103. Various components that can interact with the account abuse risk analysis system 102 can include, but are not limited to, an account database 104, one or more communication networks 105, and various workstations 106. In certain examples, the account database 104 can include account information about asset accounts held by the bank or the investment firm for various account owners. In some examples, the account information can include information such as address, date of birth, current monetary balances, etc. associated with the account or the account holder. In some examples, the account information can include historical transaction information including amounts and names associated with each deposit, withdrawal, or transfer of assets associated with the account.

One or more workstations 106 can include an input interface and can further include a user interface application running on a computer or mobile electronic device or can include a dedicated terminal for the account abuse risk analysis system 102. The input interface can allow parameter entry and initiation of an abuse risk analysis. In some examples, the user interface can allow entry of parameters for selecting accounts or transactions and for carrying out the abuse risk analysis.

The account abuse risk analysis system 102 can include a population filter 110 that can accept account parameters from the input interface and can retrieve account information from the account database 104 commensurate with the account parameters. In certain examples, a risk analysis database 111 can receive the account information from the population filter 110 to form an analysis population. In certain examples, the account parameters can include threshold values, either high or low values, including minimum account balance, maximum account balance, analysis interval, minimum transaction history duration, account holder age, etc.

The account abuse risk analysis system 102 can include a risk analysis processor 112 (e.g., a processor executing instructions to perform the operations described herein). The risk analysis processor can receive analysis parameters from input interface of the work stations 106 and can process the information in the analysis population according to the parameters and provide risk analysis information for display at one or more output interfaces, such as output interfaces or displays of the workstations 106. In certain examples, the analysis parameters can include various thresholds 113 and an analysis interval 114 for determining an abuse risk level of a single account or a population of accounts during the interval 114.

In certain examples, an abuse risk level can be assigned to an account during or after analysis by the risk analysis processor 112. In some examples, an abuse risk level can be assigned to a party associated with one or more transactions and the abuse risk level can be further assigned to one or more accounts associated with the one or more transactions. In some examples, the thresholds 113 can include, but are not limited to, maximum withdrawal amount, maximum transactions per interval of time, maximum transactions involving same party per interval of time, cash withdrawal ratio threshold or combinations thereof.

In some examples, the thresholds 113 can vary with time and the risk analysis processor 112 can receive threshold profiles that reflect the varying threshold values over the analysis interval 114. In certain examples, the risk analysis processor 112 can pre-process historical account information to prepare a threshold profile for the analysis population. For example, historical information can indicate that average withdrawals for an analysis population increases during certain intervals such as just before Christmas, for example, or decreases leading up to April 15th (US tax day) as another example. In such a case, maximum account withdrawal parameter received from the input interface can be adjusted according to a threshold profile as the risk analysis processes withdrawal transaction information within the analysis population.

In certain examples, the risk analysis processor 112 can determine one or more cash withdrawal ratios associated with an account or a party associated with transactions in the analysis population and the ratio value can be assigned an abuse risk level. For example, a current cash withdrawal ratio (CR) can be determined for an account such that, $$CR = \frac{Q_0}{AVG(Q_{-2}, Q_{-3}, \ldots, Q_{-n})},$$

where $Q_0$ is the cash withdrawal amount of the current interval and the denominator is an average of cash withdrawals from a number of previous intervals.

In certain examples, the risk analysis level can be based on more than one ratio. For example, in addition to determining the (CR), the risk analysis processor can determine a previous interval cash withdrawal ratio (PR) such that, for example, $$PR = \frac{Q_{-1}}{AVG(Q_{-2}, Q_{-3}, \ldots, Q_{-n})}.$$

In certain examples, each ratio can be assigned an abuse risk level using independent criteria. For example, an abuse risk level can be assigned a ratio according to a threshold profile that can assign different abuse risk levels for the same ratio value depending upon the analysis interval time frame. In certain examples, more than one ratio and, thus, more than one abuse risk level, can be assigned to an account. A final abuse risk level can be assigned by combining the individual risk levels by, for example, averaging the individual abuse risk levels, or weighting the individual abuse risk levels and summing for the weighted abuse risk levels. It is understood that other methods of combining multiple abuse risk levels to provide a final abuse risk level are possible without departing from the scope of the present subject matter. In some examples, a transaction ratio threshold can be established through a probabilistic modeling approach. In such an approach, a probability distribution can be used to fit the population to ensure a more precise and unbiased selection of the transaction ratio threshold. A lognormal distribution is one example of a probabilistic model that can be used and that can provide good fit for some transaction data populations. A general Parento distribution is another example of a probabilistic model that can be used and, in certain examples, can exhibit better tail fit of transaction data compared to a lognormal distribution.

In certain examples, a predetermined abuse threshold or predetermined abuse threshold profile can be modified by other asset account environment characteristics. Such other asset account environment characteristics can include general national economic information, general international economic information, general or specific industry sector information, personal historic cyclical spending information, personal historic spending information or combinations thereof. For example, general economic information that indicates a strong economy (e.g., using metrics such as gross domestic product (GDP), stock indices, etc.) and increased consumer spending may be used to increase a threshold withdrawal amount associated with certain asset accounts, as well as, vice versa (e.g., weak economic indicator results in decreased threshold). In another example, personal spending information or personal historic cyclical spending information may indicate reducing a withdrawal threshold for a population of accounts. For example, in the period of time leading up to April 15 (US tax day), the threshold can be lowered, in anticipation of a large withdrawal on or about that day, for accounts that include active, regular direct-deposit activity. The active, regular direct-deposit activity can be indicative of an employed account holder with mid to higher yearly income. If withdrawal activity does not subside somewhat in this lead-up period, it can be an indication of account abuse especially if historic transaction information indicates deceased withdrawal activity in similar situations. As such the system of FIG. 1 can optionally include one or more interfaces (e.g., APIs) to various information sources 120 to provide the economic and industry information.

Upon completion of analysis of a population of accounts for abuse risk, the results of the analysis can be formatted and presented to various personal for additional analysis. In certain examples, where a value of an abuse risk level is within an alarm range, alarm information about the account or the population of accounts can be forwarded electronically to investigators for further follow-up. In certain examples, the alarm information can include names of the account owners, information about particular transactions that contributed to the abuse risk level, parties to certain transactions that contributed to the abuse risk level, or combinations thereof.

In various examples, the components illustrated in FIG. 1 may communicate via one or more networks 105, 110. Network 110 may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. Network 110 may include a single local area network (LAN) or wide-area network (WAN), or combinations of LAN's or WAN's, such as the Internet. In certain examples, network 105 can include an internal network isolated by a firewall from network 110.

For convenience, the organization of account information is described herein as a database, such as database 104 and database 111. The specific storage layout and model used in the databases 104 111 may take a number of forms—indeed, databases 104, 111 may utilize multiple models. Databases 104, 111 may be, but are not limited to, a relational database (e.g., SQL), non-relational database (NoSQL) a flat file database, object model, document details model, or a file system hierarchy. Databases 104, 11 may store data on one or more storage devices (e.g., a hard disk, random access memory (RAM), etc.). The storage devices may be in standalone arrays, part of one or more servers, and may be located in one or more geographic areas.

Figure 2:
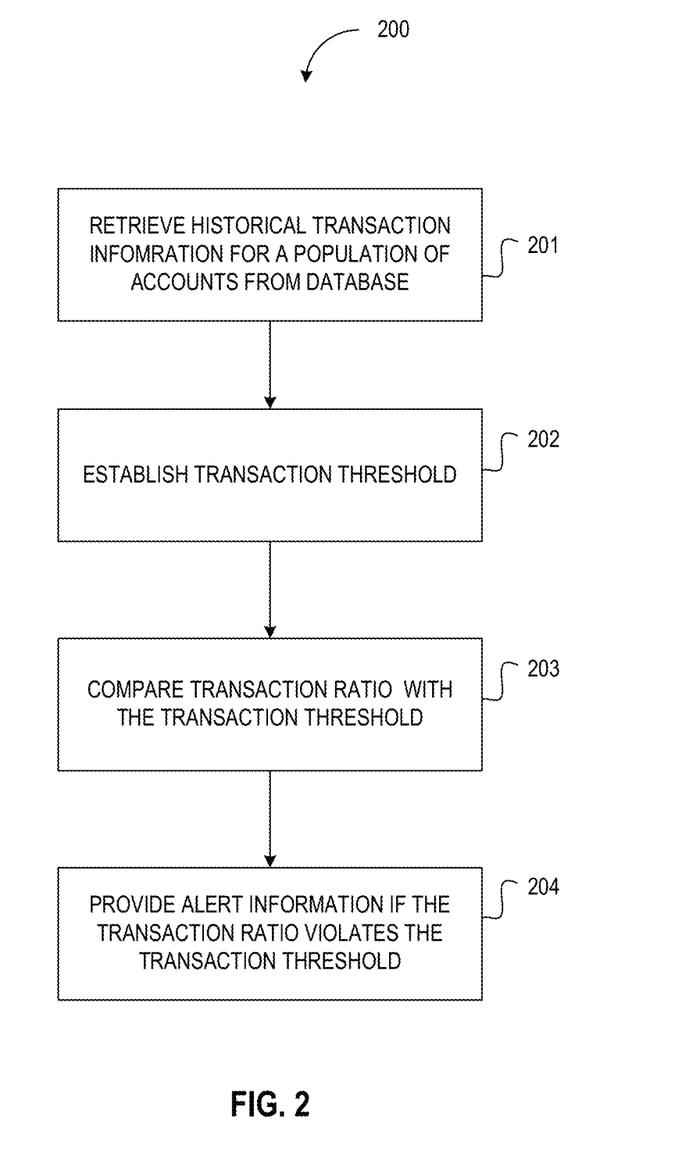
FIG. 2 illustrates general a flowchart of an example method for assessing abuse risk with one or more asset accounts.

FIG. 2 illustrates general a flowchart of an example method 200 for assessing abuse risk with one or more asset accounts. The method can be performed by one or more computing devices executing instructions stored on a non-transitory computer-readable medium to carry out operations 201-204. At 201, historical transaction information for population of accounts can be retrieved from a transaction database at an abuse risk analysis computer or system. Retrieving can include executing an SQL query that identifies one or more of the type of transaction information to retrieve, demographic information of the population, and a time period for which to retrieve the transactions. In certain examples, the historical transaction information for the population of accounts can be stored in a separate database at the abuse risk analysis system.

At 202, transaction threshold information can be established for the population at the abuse risk analysis system using the historical transaction information. In certain examples, the transaction threshold can include a transaction threshold profile that can vary depending on a particular point in time during the analysis interval of transactions. In certain examples, the transaction threshold information for the population can be dependent scaled for a particular asset account by using historical information about the account to establish, for example, a withdrawal threshold for the particular asset account. In certain examples, to establish the transaction threshold information, one or more user interfaces can be presented (transmitted) for displaying on a display device. A user can interact with the user interfaces (e.g., using an input device) and can enter information into the input user interface elements corresponding to the transaction threshold information.

At 203, a transaction ratio based on transactions occurring during the analysis interval can be compared with the transaction threshold. In certain examples, each asset account of the population of accounts can be analyzed individually. The comparison may be performed automatically without user intervention.

At 204, an alert, including alert information, can be provided if a transaction ratio violates the transaction threshold. In certain examples, the transaction ratio can be a ratio indicative of cash withdrawals form one or more accounts. Alerts can include push notifications, e-mails, text messages, pop-up messages/windows, among others, transmitted to a computing device. In some examples, a ratio indicative of an increase in cash withdrawals during the analysis interval and that exceeds the transaction threshold can form the basis of an account abuse alert. The alerts can identify one or more transactions that have violated a transaction threshold, such as by exceeding a cash withdrawal ratio, for example.

Figure 3:
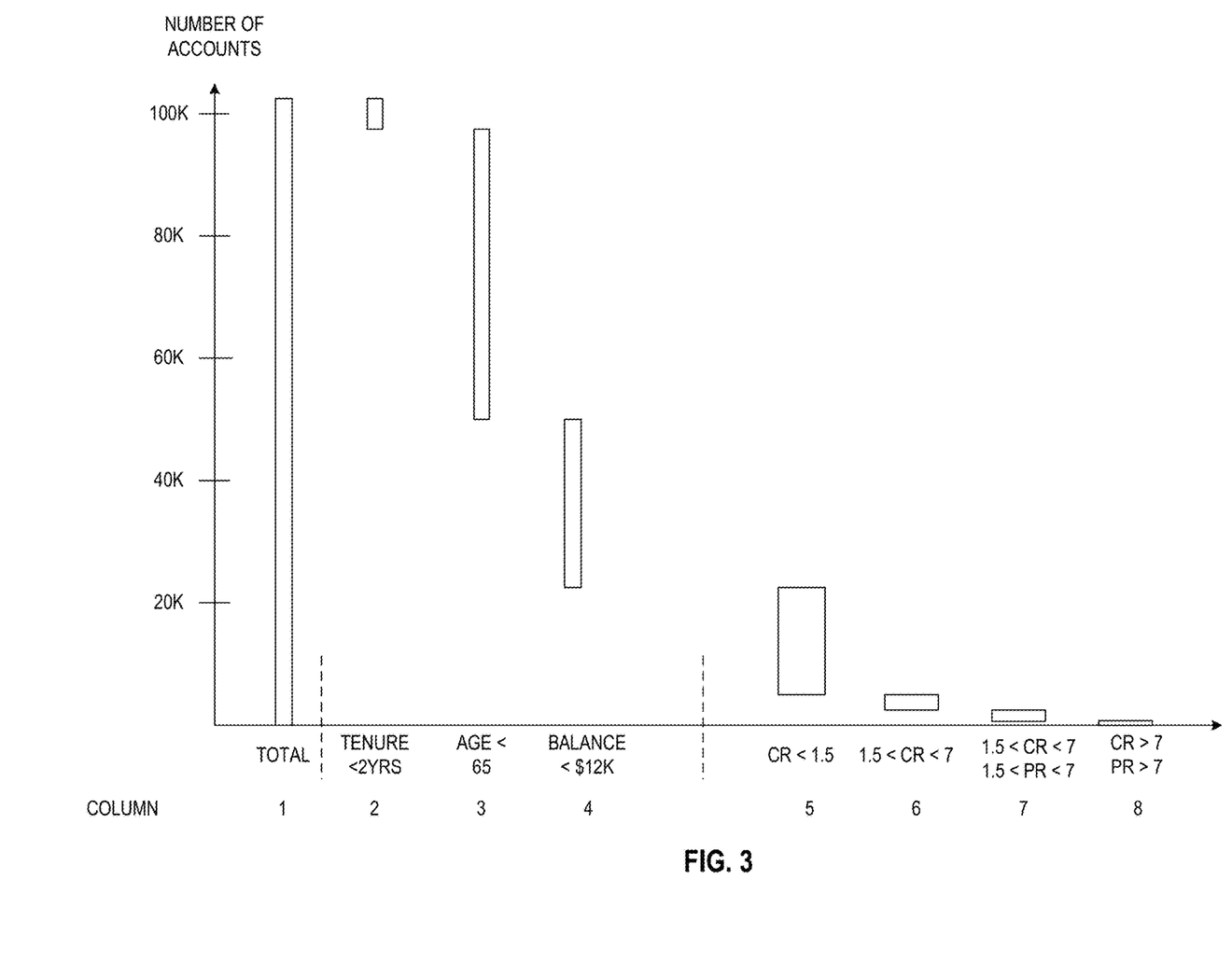
FIG. 3 illustrates graphically an account review action waterfall associated with an account abuse risk analysis.

FIG. 3 illustrates graphically an account review action waterfall associated with an account abuse risk analysis. The vertical axis is number of accounts. The horizontal axis shows a number of columns that describe the number of accounts graphically shown in the column. Column 1 shows, as an example, the total number of accounts from which to analyze a population of accounts for abuse risk. Columns 2-4 note parameters that can sequentially limit the number of accounts available for account abuse risk analysis. Columns 5-7 show how the selected population of accounts can fall within certain thresholds as a result of an account abuse risk analysis. For the specific example shown, the first column shows all the accounts in the system. The second, third and fourth columns shows respectively how many accounts are less than 2 years old, how many accounts are held by owners less than 65 years of age, and how many accounts have a balance less than $12,000.00. The parameters associated with columns two, three and four can be used to limit the population of accounts to consider for analysis. The particular parameters mentioned above can sequentially eliminate the accounts shown in columns two, three and four from analysis. The remaining accounts are thus focused on older, well-established account holders having a minimum account balance of over $12,000. The analysis can be carried out for the most current full month and the immediately preceding month based on cash withdrawal ratios (CR, PR) as discussed above. The results are shown in columns 5-8. Risk levels were assigned such that for ratios (CR, PR)<1.5, no significant increase in withdrawal activity, for ratios (CR, PR) 1.5<CR or PR<7, medium increase in withdrawal activity in one month (Column 6) or medium increase in withdrawal activity in both months (Column 7), and for ratios (CR, PR)>7, high level increase in withdrawal activity in at least one of the months.

In certain examples, columns 6-8 can be information that is forwarded to investigators for further analysis. In certain examples, account holders may be contacted, for example, electronically, to annunciate an abuse alert associated with their account. In some examples, alert information provided with an alert message can include identification of the account, identification of the analysis interval, identification of one or more transactions contributing to a high cash withdrawal ratio, identification of other parties associated with the one or more transactions, or combinations thereof.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 4:
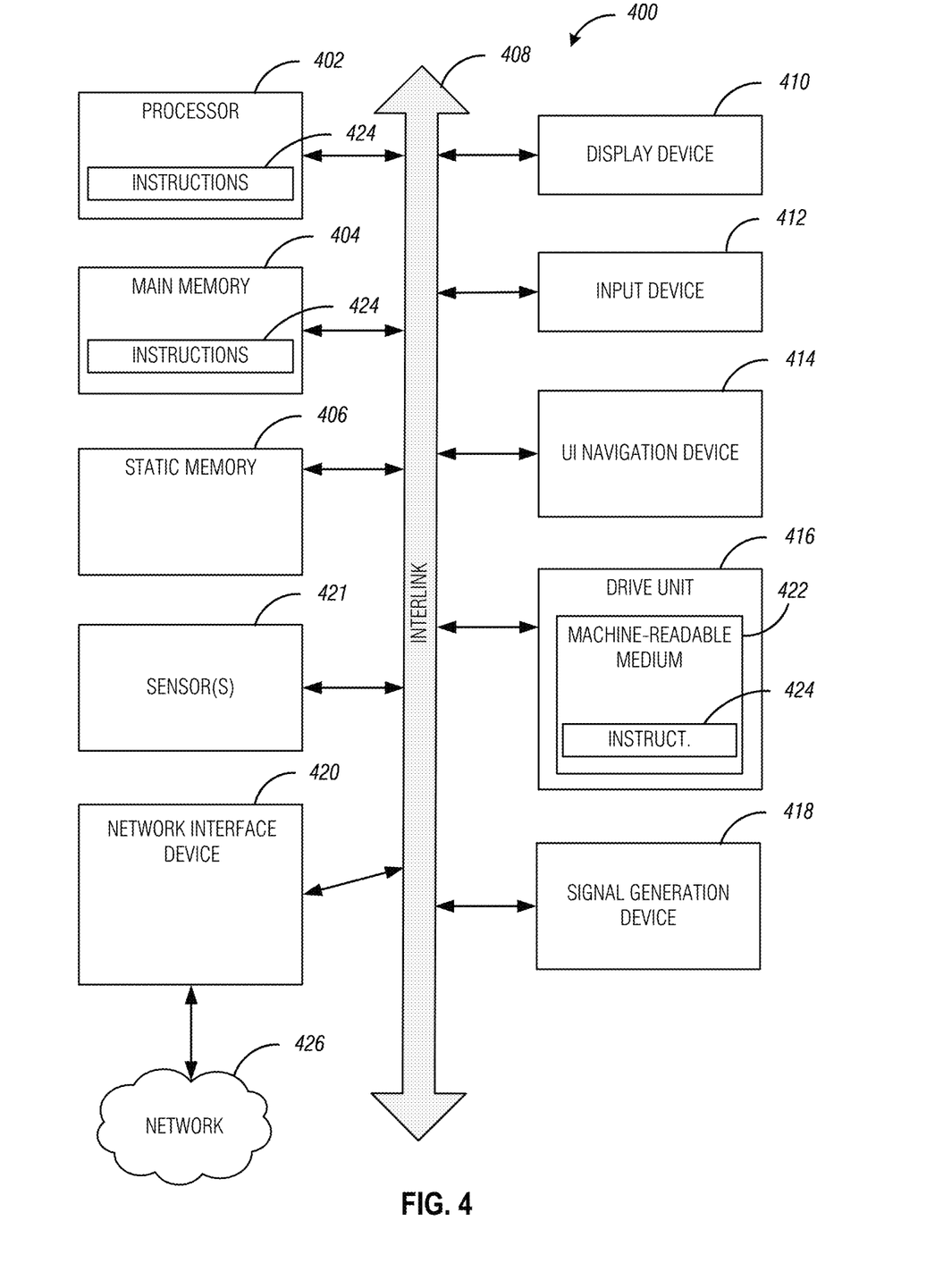
FIG. 4 is a block diagram illustrating a machine in the example form of a computer system within which a set or sequence of instructions may be executed to cause the machine to perform any one of the methodologies discussed herein, according to an example embodiment.

FIG. 4 is a block diagram illustrating a machine in the example form of a computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 6G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

EXAMPLES AND NOTES

In Example 1, a method for detecting abuse of an asset account can include receiving historical transaction information for a population of asset accounts from a transaction database, establishing a transaction threshold for the population of asset accounts at a fraud analysis circuit using the historical transaction information, comparing a transaction ratio with the transaction threshold, wherein the transaction ratio is based on transactions occurring during an analysis interval, and providing alert information if a transaction ratio associated with the analysis interval, exceeds the transaction threshold.

In Example 2, the method of Example 1 optionally includes determining the population of accounts from an account database using one or more account thresholds.

In Example 3, the one or more account thresholds of any one or more of Examples 1-2 optionally includes an account holder's age threshold.

In Example 4, the one or more account thresholds of any one or more of examples 1-3 optionally includes an account balance threshold.

In Example 5, the one or more account thresholds of any one or more of examples 1-4 optionally includes a length of account history threshold.

In Example 6, the population of accounts of any one or more of examples 1-5 optionally includes investment accounts.

In Example 7, the historical transaction information of any one or more of examples 1-6 optionally is historical cash withdrawal information, the transaction threshold of any one or more of examples 1-6 optionally is a cash withdrawal threshold, and the transaction ratio of any one or more of examples 1-6 optionally is a cash withdrawal ratio.

In Example 8, the establishing the transaction threshold of any one or more of examples 1-7 optionally includes using the historical cash withdrawal information and an economic indicator.

In Example 9, the comparing a transaction ratio of any one or more of examples 1-8 optionally includes determining a current interval cash withdrawal ratio (CR), wherein, $$CR = \frac{Q_0}{AVG(Q_{-2}, Q_{-3}, \ldots, Q_{-n})},$$

wherein $Q_0$ is a cash withdrawal amount of a particular interval within the analysis interval and Q–n are cash withdrawal amounts of intervals preceding $Q_0$ by –n intervals.

In Example 10, the providing alert information of any one or more of examples 1-9 optionally includes providing transaction information associated with analysis interval when the current interval cash withdrawal ratio (CR) associated exceeds the transaction threshold.

In Example 11, the comparing a transaction ratio of any one or more of examples 1-10 optionally includes determining a previous interval cash withdrawal ratio (PR), wherein, $$PR = \frac{Q_{-1}}{AVG(Q_{-2}, Q_{-3}, \ldots, Q_{-n})},$$

wherein $Q_{-1}$ is a cash withdrawal amount of an interval immediately preceding particular interval and $Q_{-n}$ are cash withdrawal amounts of intervals preceding $Q_0$ by –n intervals.

In Example 12, the providing alert information of any one or more of examples 1-11 optionally includes providing transaction information associated with the particular interval when at least one of the current interval cash withdrawal ratio (CR) or the previous interval cash withdrawal ratio (PR) associated exceeds the transaction threshold.

In Example 13, the providing alert information of any one or more of examples 1-12 optionally includes providing transaction information associated with the particular interval when the current interval cash withdrawal ratio (CR) and the previous interval cash withdrawal ratio (PR) exceeds the transaction threshold.

In Example 14, the providing alert information of any one or more of examples 1-13 optionally includes providing identification information of a second account involved with at least one transaction associated with the transactions occurring during the analysis interval.

In Example 15, the method of any one or more of examples 1-14 optionally includes transmitting an alert message to a computing device of an account holder, wherein the account holder is associated with an account included the population of asset accounts, and wherein the message includes at least a portion of the alert information.

In Example 16, a system can include at least one processor, a storage device comprising instructions, which when executed by the at least one processor, configure the at least one processor to perform operations to receive historical transaction information for a population of accounts from a transaction database, to establish a transaction threshold for the population of accounts using the historical transaction information, to compare a transaction ratio with the transaction threshold, wherein the transaction ratio is based on transactions occurring during an analysis interval, to provide alert information if a transaction ratio associated with the analysis interval, exceeds the transaction threshold.

In Example 17, the at least one processor of any one or more of examples 1-16 optionally is further configured to, when executing the instructions, determine a current interval cash withdrawal ratio (CR), wherein, $$CR = \frac{Q_0}{AVG(Q_{-2}, Q_{-3}, \ldots, Q_{-n})};$$

wherein $Q_0$ is a cash withdrawal amount of a particular interval within the analysis interval and Q–n are cash withdrawal amounts of intervals preceding $Q_0$ by –n intervals.

In Example 18, the at least one processor of any one or more of examples 1-17 optionally is further configured to, when executing the instructions, provide transaction information associated with the particular interval as part of the alert information when the current interval cash withdrawal ratio (CR) exceeds the transaction threshold.

In Example 19, the at least one processor of any one or more of examples 1-18 optionally is further configured to, when executing the instructions, to determine a previous interval cash withdrawal ratio (PR), wherein, $$PR = \frac{Q_{-1}}{AVG(Q_{-2}, Q_{-3}, \ldots, Q_{-n})};$$

wherein $Q_{-1}$ is a cash withdrawal amount of an interval immediately preceding particular interval and Q–n are cash withdrawal amounts of intervals preceding $Q_0$ by –n intervals.

In Example 20, the at least one processor of any one or more of examples 1-19 optionally is further configured to, when executing the instructions, provide second transaction information associated with the particular interval when at least one of the current interval cash withdrawal ratio (CR) or the previous interval cash withdrawal ratio (PR) exceeds the transaction threshold.

In Example 21, a non-transitory computer-readable medium comprising instructions, which when executed by at least one processor, configure the at least one processor to perform operations comprising receiving historical transaction information for a population of asset accounts from a transaction database, establishing a transaction threshold for the population of asset accounts at a fraud analysis circuit using the historical transaction information, comparing a transaction ratio with the transaction threshold, wherein the transaction ratio is based on transactions occurring during an analysis interval, and providing alert information if a transaction ratio associated with the analysis interval, exceeds the transaction threshold.

In Example 22, the comparing a transaction ratio of any one or more of examples 1-21 optionally includes determining a current interval cash withdrawal ratio (CR), wherein, $$CR = \frac{Q_0}{AVG(Q_{-2}, Q_{-3}, \ldots, Q_{-n})};$$

wherein $Q_0$ is a cash withdrawal amount of a particular interval within the analysis interval and Q–n are cash withdrawal amounts of intervals preceding $Q_0$ by –n intervals.

In Example 23, the providing alert information of any one or more of examples 1-22 optionally includes providing first transaction information associated with a transaction occurring during the analysis interval when the current interval cash withdrawal ratio (CR) exceeds the transaction threshold.

In Example 24, the comparing a transaction ratio of any one or more of examples 1-23 optionally includes determining a previous interval cash withdrawal ratio (PR), wherein, $$PR = \frac{Q_{-1}}{AVG(Q_{-2}, Q_{-3}, \ldots, Q_{-n})};$$

wherein $Q_{-1}$ is a cash withdrawal amount of an interval immediately preceding particular interval and Q–n are cash withdrawal amounts of intervals preceding $Q_0$ by –n intervals, and providing second alert transaction information associated with a second transaction occurring during the analysis interval when at least one of the current interval cash withdrawal ratio (CR) or the previous interval cash withdrawal ratio (PR) exceeds the transaction threshold.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method for detecting abuse of an asset account, the method comprising:
    receiving historical transaction information for an asset account from a population of asset accounts from a transaction database, wherein the transaction database includes records of different types of transactions for each asset account, including cash withdrawal transactions;
    calculating a cash withdrawal transaction ratio for a recent time interval for the asset account based on a total number of cash withdrawal transactions that occurred during the recent time interval and an average number of cash withdrawal transactions that occurred for a set of previous time intervals;
    selecting a profile from a plurality of profiles based on when the recent time interval occurs within a calendar year, wherein each profile of the plurality of profiles includes a withdrawal threshold;
    establishing a cash withdrawal transaction threshold for the population of asset accounts at a fraud analysis circuit using the historical transaction information, wherein the cash withdrawal transaction threshold is a value comparable to the cash withdrawal transaction ratio which is used as an indicator of cash withdrawal abuse;
    adjusting the cash withdrawal transaction threshold based on the withdrawal threshold of the profile;
    determining whether cash withdrawal abuse has occurred by comparing the cash withdrawal transaction ratio to the cash withdrawal transaction threshold; and
    providing alert information if the cash withdrawal transaction ratio exceeds the cash withdrawal transaction threshold.

2. The method of claim 1, including determining the population of asset accounts from an account database using one or more account thresholds.

3. The method of claim 2, wherein the one or more account thresholds includes an account holder's age threshold.

4. The method of claim 2, wherein the one or more account thresholds includes an account balance threshold.

5. The method of claim 2, wherein the one or more account thresholds includes a length of account history threshold.

6. The method of claim 1, wherein the population of asset accounts includes investment accounts.

7. The method of claim 1, wherein establishing the cash withdrawal transaction threshold includes using the historical cash withdrawal information and an economic indicator.

8. The method of claim 1, wherein the comparing the cash withdrawal transaction ratio includes determining a current interval cash withdrawal ratio (CR), wherein, $$CR = \frac{Q_0}{AVG(Q_{-2}, Q_{-3}, \ldots, Q_{-n})};$$

wherein $Q_0$ is a cash withdrawal amount of a particular interval within an analysis interval and Q–n are cash withdrawal amounts of intervals preceding $Q_0$ by –n intervals.

9. The method of claim 8, wherein providing alert information includes providing transaction information associated with the analysis interval when the current interval cash withdrawal ratio (CR) associated exceeds the cash withdrawal transaction threshold.

10. The method of claim 8, wherein the comparing the cash withdrawal transaction ratio includes determining a previous interval cash withdrawal ratio (PR), wherein, $$PR = \frac{Q_{-1}}{AVG(Q_{-2}, Q_{-3-n}, \ldots, Q_{-n})};$$

wherein $Q_{-1}$ is a cash withdrawal amount of an interval immediately preceding particular interval and Q–n are cash withdrawal amounts of intervals preceding $Q_0$ by –n intervals.

11. The method of claim 10, wherein providing alert information includes providing transaction information associated with the particular interval when at least one of the current interval cash withdrawal ratio (CR) or the previous interval cash withdrawal ratio (PR) associated exceeds the cash withdrawal transaction threshold.

12. The method of claim 10, wherein providing alert information includes providing transaction information associated with the particular interval when the current interval cash withdrawal ratio (CR) and the previous interval cash withdrawal ratio (PR) exceeds the cash withdrawal transaction threshold.

13. The method of claim 8, wherein the providing alert information includes providing identification information of a second account involved with at least one transaction associated with the transactions occurring during the analysis interval.

14. The method of claim 1, including transmitting an alert message to a computing device of an account holder;
    wherein the account holder is associated with an account included the population of asset accounts; and wherein the message includes at least a portion of the alert information.

15. A system comprising:
   at least one processor;
   a storage device comprising instructions, which when executed by the at least one processor, configure the at least one processor to perform operations to:
   receive historical transaction information for an asset account from a population of accounts from a transaction database, wherein the transaction database includes records of different types of transactions for each asset account, including cash withdrawal transactions;
   calculate a cash withdrawal transaction ratio for a recent time interval for the asset account based on a total number of cash withdrawal transactions that occurred during the recent time interval and an average number of cash withdrawal transactions that occurred for a set of previous time intervals;
   select a profile from a plurality of profiles based on when the recent time interval occurs within a calendar year, wherein each profile of the plurality of profiles includes a withdrawal threshold;
   establish a cash withdrawal transaction threshold for the population of accounts using the historical transaction information, wherein the cash withdrawal transaction threshold is a value comparable to the cash withdrawal transaction ratio which is used as an indicator of cash withdrawal abuse;
   adjust the cash withdrawal transaction threshold based on the withdrawal threshold of the profile;
   determining whether cash withdrawal abuse has occurred by comparing the cash withdrawal transaction ratio to the cash withdrawal transaction threshold; and
   provide alert information if the cash withdrawal transaction ratio exceeds the cash withdrawal transaction threshold.

16. The system of claim 15, wherein the at least one processor is further configured to, when executing the instructions:
   determine a current interval cash withdrawal ratio (CR), wherein, $$CR = \frac{Q_0}{AVG(Q_{-2}, Q_{-3}, \ldots, Q_{-n})};$$

and
   wherein $Q_0$ is a cash withdrawal amount of a particular interval within an analysis interval and $Q_{-n}$ are cash withdrawal amounts of intervals preceding $Q_0$ by $-n$ intervals.

17. The system of claim 16, wherein the at least one processor is further configured to, when executing the instructions:
   provide transaction information associated with the particular interval as part of the alert information when the current interval cash withdrawal ratio (CR) exceeds the cash withdrawal transaction threshold.

18. The system of claim 16, wherein the at least one processor is further configured to, when executing the instructions:
   determine a previous interval cash withdrawal ratio (PR), wherein, $$PR = \frac{Q_{-1}}{AVG(Q_{-2}, Q_{-3}, \ldots, Q_{-n})};$$

and
   wherein $Q_{-1}$ is a cash withdrawal amount of an interval immediately preceding particular interval of interest and $Q_{-n}$ are cash withdrawal amounts of intervals preceding $Q_0$ by $-n$ intervals.

19. The system of claim 18, wherein the at least one processor is further configured to, when executing the instructions:
   provide second transaction information associated with the particular interval when at least one of the current interval cash withdrawal ratio (CR) or the previous interval cash withdrawal ratio (PR) exceeds the cash withdrawal transaction threshold.

20. A non-transitory computer-readable medium comprising instructions, which when executed by at least one processor, configure the at least one processor to perform operations comprising:
   receiving historical transaction information for an asset account from a population of asset accounts from a transaction database, wherein the transaction database includes records of different types of transactions for each asset account, including cash withdrawal transactions;
   calculating a cash withdrawal transaction ratio for a recent time interval for the asset account a total number of cash withdrawal transactions that occurred during the recent time interval and an average number of cash withdrawal transactions that occurred for a set of previous time intervals;
   selecting a profile from a plurality of profiles based on when the recent time interval occurs within a calendar year, wherein each profile of the plurality of profiles includes a withdrawal threshold;
   establishing a cash withdrawal transaction threshold for the population of asset accounts at a fraud analysis circuit using the historical transaction information, wherein the cash withdrawal transaction threshold is a value comparable to the cash withdrawal transaction ratio which is used as an indicator of cash withdrawal abuse;
   adjusting the cash withdrawal transaction threshold based on the withdrawal threshold of the profile;
   determining whether cash withdrawal abuse has occurred by comparing the cash withdrawal transaction ratio to the cash withdrawal transaction threshold; and
   providing alert information if the cash withdrawal transaction ratio exceeds the cash withdrawal transaction threshold.

21. The computer-readable storage medium of claim 20, wherein comparing the cash withdrawal transaction ratio includes determining a current interval cash withdrawal ratio (CR), wherein, $$PR = \frac{Q_{-1}}{AVG(Q_{-2}, Q_{-3}, \ldots, Q_{-n})};$$

wherein $Q_0$ is a cash withdrawal amount of a particular interval within an analysis interval and $Q_{-n}$ are cash withdrawal amounts of intervals preceding $Q_0$ by $-n$ intervals.

22. The computer-readable storage medium of claim 21, wherein providing alert information includes providing first transaction information associated with a transaction occurring during the analysis interval when the current interval cash withdrawal ratio (CR) exceeds the transaction threshold.

23. The computer-readable storage medium of claim 22, wherein comparing a transaction ratio includes:
   determining a previous interval cash withdrawal ratio (PR), wherein, $$PR = \frac{Q_{-1}}{AVG(Q_{-2}, Q_{-3}, \ldots, Q_{-n})},$$

wherein $Q_{-1}$ is a cash withdrawal amount of an interval immediately preceding particular interval of interest and $Q-n$ are cash withdrawal amounts of intervals preceding $Q_0$ by $-n$ intervals; and
   providing second alert transaction information associated with a second transaction occurring during the analysis interval when at least one of the current interval cash withdrawal ratio (CR) or the previous interval cash withdrawal ratio (PR) exceeds the cash withdrawal transaction threshold.

* * * * *

UNITED STATES PATENT AND TRADEMARK OFFICE
CERTIFICATE OF CORRECTION

PATENT NO. : 10,949,863 B1
APPLICATION NO. : 15/164640
DATED : March 16, 2021
INVENTOR(S) : Lenz et al.

It is certified that error appears in the above-identified patent and that said Letters Patent is hereby corrected as shown below:

In the Claims

In Column 12, Line 26, in Claim 8, delete "Q-n" and insert --$Q_{-n}$-- therefor In Column 12, Lines 37-42, in Claim 10, delete " $PR = \dfrac{Q_{-1}}{AVG(Q_{-2}, Q_{-3}, \ldots, Q_{-n})};$ " and insert -- $PR = \dfrac{Q_{-1}}{AVG(Q_{-2}, Q_{-3}, \ldots, Q_{-n})};$ -- therefor In Column 12, Line 44, in Claim 10, delete "Q-n" and insert --$Q_{-n}$-- therefor In Column 13, Line 53, in Claim 16, delete "Q-n" and insert --$Q_{-n}$-- therefor In Column 14, Line 9, in Claim 18, delete "Q-n" and insert --$Q_{-n}$-- therefor In Column 14, Lines 58-63, in Claim 21, after " $PR = \dfrac{Q_{-1}}{AVG(Q_{-2}, Q_{-3}, \ldots, Q_{-n})};$ ", insert --and--

In Column 14, Line 65, in Claim 21, delete "Q-n" and insert --$Q_{-n}$-- therefor In Column 15, Line 18, in Claim 23, delete "Q-n" and insert --$Q_{-n}$-- therefor Signed and Sealed this
Eighth Day of June, 2021

Drew Hirshfeld
*Performing the Functions and Duties of the
Under Secretary of Commerce for Intellectual Property and
Director of the United States Patent and Trademark Office*